INVENTOR
NOEMI G. MARTINEZ NADAL

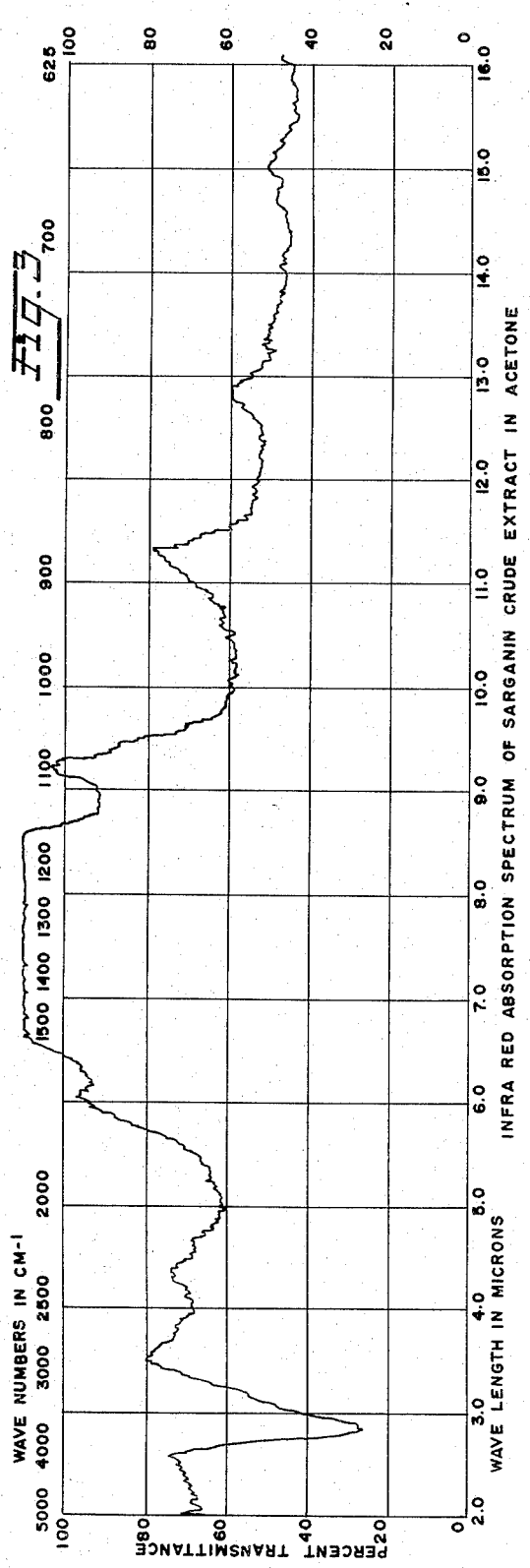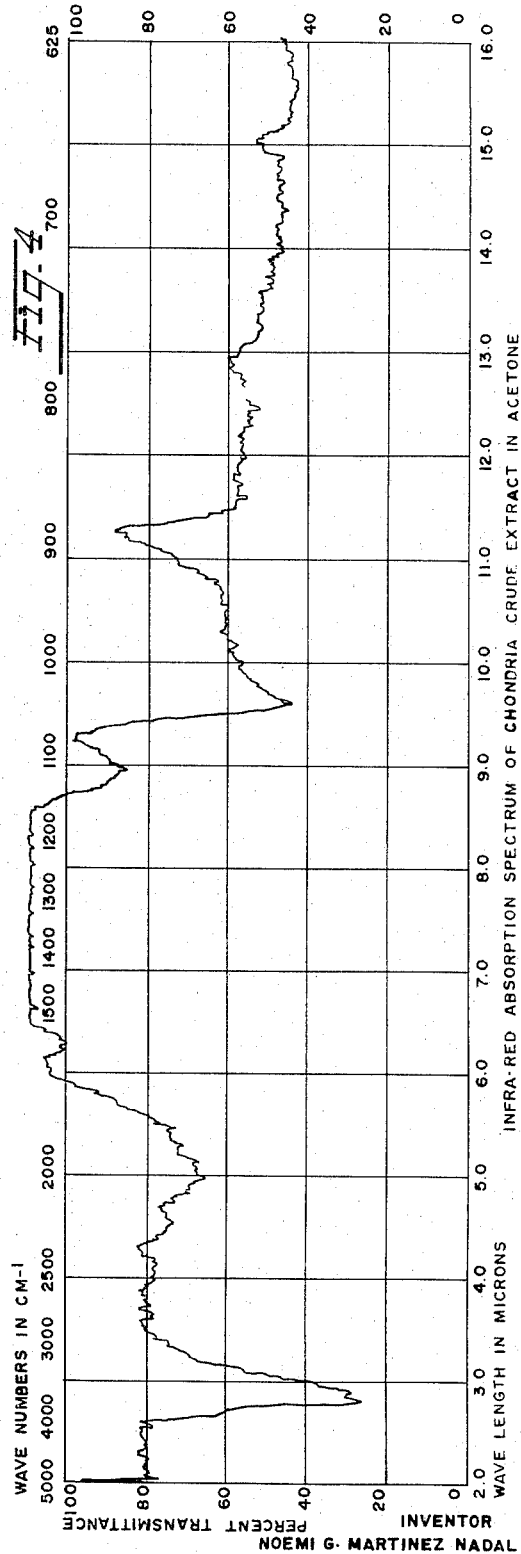

INVENTOR

NOEMI G. MARTINEZ NADAL

BY
Scrivener, Parker, Scrivener & Clarke
ATTORNEYS

United States Patent Office 3,415,928
Patented Dec. 10, 1968

3,415,928
PROCESS FOR PRODUCING ANTIBIOTIC, ANTI-FUNGAL AND ANTIFOULANT SUBSTANCES BY SOLVENT EXTRACTION OF *SARGASSUM NATANS, CHONDRIA LITTORALIS* AND *CYMPOLIA BARBATA*, AND THE RESULTING PRODUCTS
Noemi G. Martinez Nadal, Mayaguez, Puerto Rico, assignor to the people of Puerto Rico
Filed July 24, 1964, Ser. No. 385,016
6 Claims. (Cl. 424—195)

ABSTRACT OF THE DISCLOSURE

A crude extract is obtained by extracting with ethyl ether a dried or fresh alga of the class of *Sargassum natans, Chondria littoralis* and *Cympolia barbata*. The crude extract contains substances identified as sarganin complex, sarganan and sarganol having antibacterial, antifungal and antifoulant properties.

---

The present invention relates to substances having antibiotic activity and, more particularly, to such substances derived from algae.

The novel substances of the invention are identified as:

(a) A new antibiotic, sarganin, which is a complex extracted from algae and which comprises principally two different chemically related substances designated as sarganin A and sarganin B. Two different complexes may contain the same components, but in different proportions. One component may be found in one complex, but not in another;

(b) Crude extracts from which these complexes have been isolated, so far, namely sarganin extract from *Sargassum natans*, and other species of Sargassum; chonalgin extract from *Chondria littoralis* and cymopolia extract from *Cymopolia barbata;* and (c) *Sarganin* like substances, sarganol and sarganan, including any preparation or residue isolated from the brown alga, *S. natans* which shows antibiotic spectrum similar to the sarganin complex.

The invention will now be described from the following four main aspects, namely:

(1) The characteristics and properties of sarganin complex.
(2) The characteristics of the crude extracts, specifically sarganin, chonalgin and cymopolia.
(3) The isolation and purification of sarganin complex.
(4) The characteristics, isolation and purification of sarganan, sarganol and sarganin-like substances.

(1) The characteristics and properties of sarganin complex

It had first been thought, as set forth in the paper delivered by Martínez Nadal et al. at the Third Interscience Conference on Antimicrobial Agents and Chemotherapy at Washington, D.C., on Oct. 28–30, 1963, that there were obtained from the algae two substances, sarganin and chonalgin, but it was later found that these substances were essentially the same; what had been thought to be differences having arisen from varying amounts of impurities. Sarganin and chonalgin have been found to comprise principally two different chemically related substances designated sarganin A and sarganin B. These two entities together with impurities constitute the sarganin complex.

(i) Physical properties

The following physical properties have been determined upon the purest material so far obtained.

In general, sarganin complex is a volatile oily substance with a strong irritating smell. It has an index of refraction of $n_d^{25}=1.4380$ and boils at 58–60° C. Upon analysis it contains carbon, hydrogen, oxygen and sulphur. Infra-red analysis indicates the presence of a phenolic hydrogen bonding O—H: 3300–3700 cm.$^{-1}$ (2.7–3.3$\mu$) and probably an acid anhydride group:

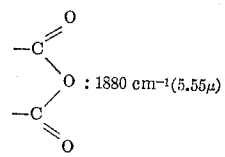

$1880\ \text{cm}^{-1}(5.55\mu)$

Figure 1:
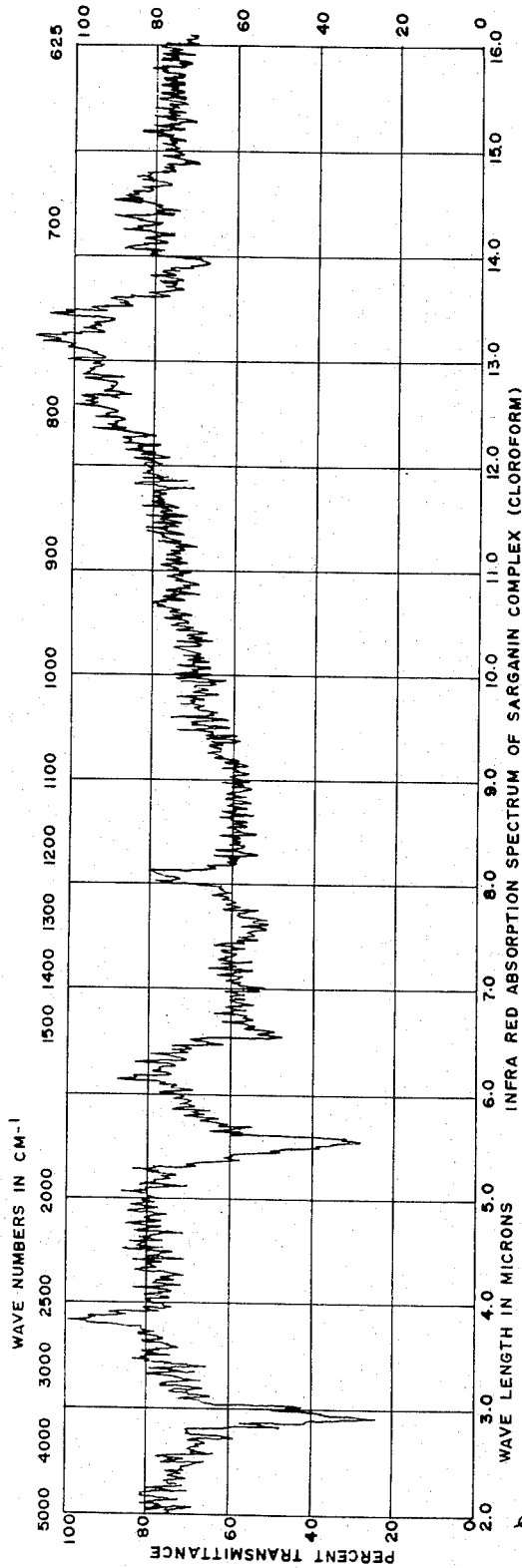

The infra-red absorption spectrum is as shown in FIG. 1.

(ii) Chemical properties

Sarganin complex is an acid substance, pH 4–5, soluble in ethyl ether, ethanol, benzene and chloroform. It is slightly soluble in water. It is stable, at room temperature at its normal pH, and in bufferized solutions (pH 6.8). It loses activity in basic solutions. The antibiotic did not give coloration in the ferric chloride, Millon, Fehling, Ninhydrin, Benedict, Soliwanoff and Molish tests.

Figure 2:
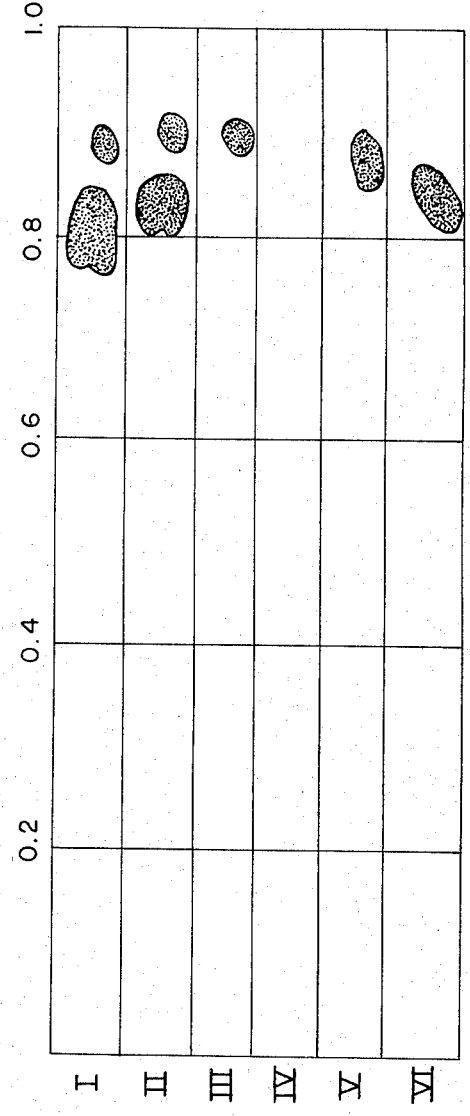

Sarganin complex is resolved into sarganin A and sarganin B by paper chromatography. The results of such a resolution in six different solvent systems are shown in FIG. 2. These two entities in various proportions and with a limited amount of impurities constitute the sarganin complex.

(iii) Biological activity of antibiotic sarganin complex

Sarganin complex possesses valuable antibiotic, antifungal and antifoulant properties. It was distinguished from other antibiotics by descending paper chromatography (see FIG. 2). Sarganin A and sarganin B were located by bioautography on trays of agar seeded with *Bacillus subtilis*. It is a broad spectrum antibiotic and a concentration of 6 $\mu$g./ml. produced the following inhibition zones.

| Species: | Inhibition zone mm. |
|---|---|
| *Staphylococcus pyogenes* | 45 |
| *Bacillus subtilis* | 28 |
| *Mycobacterium smegmatis* | 40 |
| *Escherichia coli* | 22 |
| *Proteus vulgaris* | 39 |
| *Pseudomonas seruginosa* | 32 |
| *Saccharomyces cerevisiae* | 18 |
| *Candida albicans* | 33 |
| *Salmonella schottmuelleri* | 16 |
| *Klebsiella pneumoniae* | 20 |
| *Sardinea lutea* | 35 |
| *Salmonella gallinarum* | 26 |

In vitro tests revealed that there is a slight variation in the size of the zone from sarganin complex extracted from *S. natans*, from *Chondria littoralis* and from *Cymopolia barbata*. It is thought that the proportions of the two activities are not the same in the different complexes, and that there might be a limited amount of impurities which act as enhancement factors in the different complexes.

Toxicity tests indicated that rabbits and mice tolerated 24 mg. of sarganin complex injected intravenously and intraperitoneally every week for a period of 6 weeks.

(2) The characteristics of the crude extracts specifically sarganin, chonalgin and cymopolin Three different algae, namely the brown alga, *Sargassum natans*, the red alga, *Chondria littoralis* and the green alga, *Cymopolia barbata* have been found to contain the sarganin complex in their crude extracts. These complexes which exhibit antifungal, antibacterial and antifoulant properties once purified should be denominated sarganin irrespective of its origin. Sarganin complex have been identified in these crude extracts by its physical, chemical and biological characteristics, already described. It should be noted that these extracts contain besides the sarganin complex, a variable amount of impurities which act as "enhancement factors" and which should be known as sarganin residues.

(a) Sarganin crude extract

Continuous extraction of dried *S. natans* and other species of Sargassum with ethyl ether gives an extract which on removal of the solvent at reduced pressure is very active. It should be denominated sarganin crude extract. This extract is brownish-greenish in color, separates into a semi-solid greenish-black mass and a clear pinkish volatile oily portion of a strong irritating smell. Both portions together and separately showed strong antibiotic, antifungal and antifoulant properties. It was active against *Bacillus subtilis, E. Coli, Pseudomonas aeruginosa, Proteus vulgaris, Mycobacterium smegmatis, Staphylococcus aureus, Candida albicans, Kloeckera apiculata, Penicillium chrysogenum, Aspergillus niger, Torulopsis utilis, Saccharomyces cerevisiae and Schizosaccharomyces pombe.* Both parts of the extract contain the sarganin complex but it is most concentrated in the clear portion. The infra-red absorption spectrum of sarganin crude extract is shown in FIG. 3.

(b) Chondria crude extract

It is obtained by the same method described for sarganin crude extract. It is reddish-brown in color and when concentrated separates into a clear oily portion and a dark semi-solid mass. Both portions together and separately are active and contain sarganin complex. It possesses the same biological activity as the sarganin crude extract, but shows larger inhibition zones against *E. coli, Candida albicans* and *Mycobacterium smegmatis.* This crude extract is less stable than the rest of the crude extracts described. The infra-red absorption spectrum of chondria crude extract is shown in FIG. 4.

(c) Cymopolia crude extract

Figure 5:
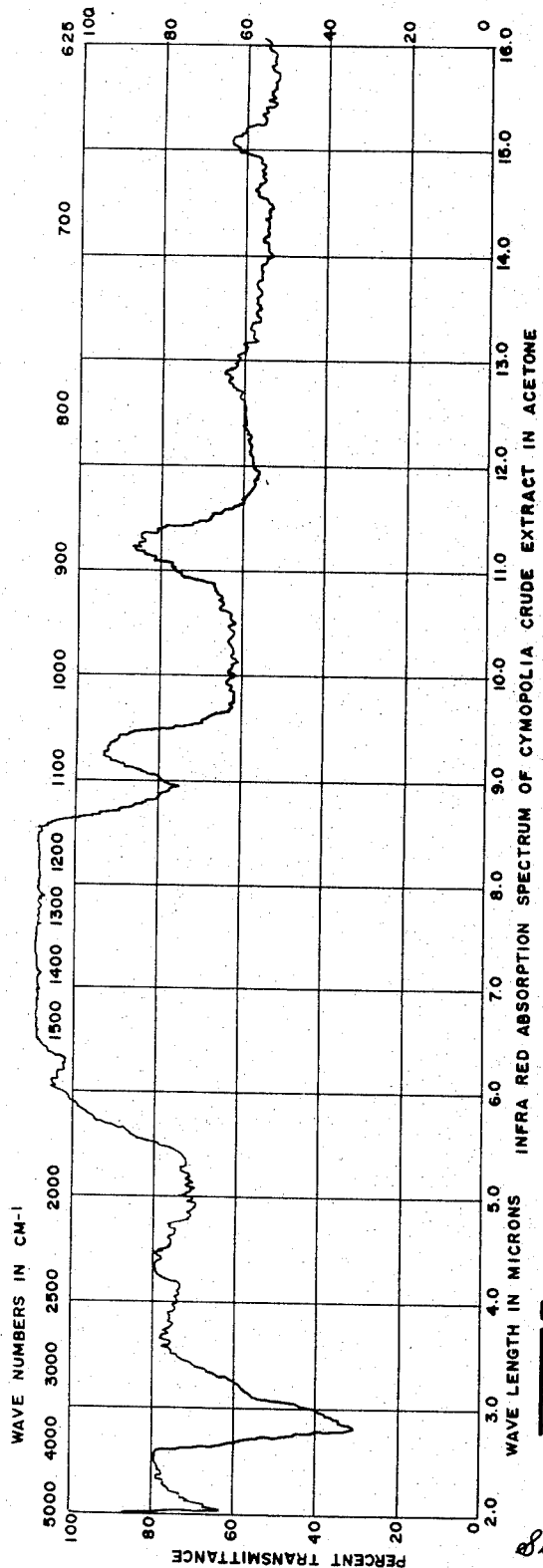

It is obtained in the same way as the other extracts described. It is deep green in color and separates in a semi-solid greenish-black mass and a yellow clear portion. Both portions together and separately are active and contain sarganin complex. It shows the same biological activity as the other two extracts described, but its inhibition zones are larger against fungi. Besides sarganin complex, all three crude extracts have a small amount of dark precipitate (melting point 40–45° C.) which shows limited antimicrobial activity. The infrared absorption spectrum of cymopolia crude extract is shown in FIG. 5.

(3) The isolation and purification of the sarganin complex

The new antibiotic sarganin is a complex isolated from dried and fresh algae by spontaneous or continuous extraction with a suitable solvent such as ethyl ether, ethanol or benzene. The solvent is then removed, for example by concentration in vacuo. The crude extract separates into a semi-solid dark mass and a clear volatile oily portion of a strong irritating smell. Both parts of the extract contain the sarganin complex but it is most concentrated in the clear portion. Separation is accomplished by physical methods, such as filtration or decantation. The clear portion may be purified by high-vacuum distillation or by adsorption on Norite A and subsequent extraction of the adsorbate by an appropriate solvent, such as ethyl ether. Another alternative method of purifying crude sarganin is by chromatographic adsorption on alumina followed by successive elutions with benzene, ethyl ether, chloroform or acetone.

Sarganin complex resolves into sarganin A and sarganin B by paper chromatography in six different solvents. However, these two entities which together with impurities constitute the sarganin complex exhibit similar physicochemical properties as well as biological activity. These methods of purification may be employed or in combination with one another.

The following examples of the preparation and purification of sarganin complex are now given by way of illustration only.

Example 1.—Extraction of sarganin complex

Eight hundred grams of algae, in this case *Sargassum natans* (thoroughly washed and dehydrated by exposure to electric light for 60 hours at a temperature of 50° C.) was extracted in a continuous extractor for 67 hours, in this case with purified boiling ethyl ether (peroxide free).

The solvent was removed in a Buchler Flash Evaporator at reduced pressure. The concentrated crude extract, which gave complete inhibition of *B. subtilis*, separated into two portions which already has been described. The light oily portion was purified by high vacuum distillation obtaining a major fraction which distills from 45–55° C. at vacuum 27.8 inches of mercury. This fraction consists mainly of the sarganin complex.

The dark semi-solid mass was redissolved in petroleum ether (30–60° C.) and chromatographed in an alumina column. The results of the column were as follows:

Results

| Fraction | Solvent | Activity |
|---|---|---|
| 1–4 | Petroleum ether | Complete inhibition. |
| 5–12 | Benzene | Active 42 mm. |
| 13–20 | Acetone | Active 32 mm. |
| 20–36 | Alcohol/$H_2O$ | Crystalline material. |

Fractions 1–4 were subsequently purified by adsorption on Norite A and subsequent extraction with ethyl ether. Sarganin complex was obtained and a small amount of a dark precipitate (melting point 40–45° C.) which shows limited activity.

Fractions 5–12 were purified by removal of the solvent and rechromatographic separation on alumina as previously described. Sarganin complex was obtained.

Fractions 13–20 on removal of the solvent gave a reddish-brown oily substance, acid in nature and which is described later on as sarganol.

Fractions 20–36 on removal of solvents gave a mixture of low-molecular carbohydrates which were identified by paper chromatography and derivatives, as d-mannitol, mannitol monoacetate and an unidentified carbohydrate which will be described as sarganan. Small quantities of a white unidentified precipitate (melting 173–180° C.) with slight antibiotic properties was also obtained.

(4) Characteristics, isolation and purification of sarganan, sarganol and sarganin-like substances We have isolated from the brown alga, *S. natans*, d-mannitol, d-mannitol monoacetate, an unknown carbohydrate which shows limited antibiotic in vitro which we name sarganan and a noticeable quantity of an oily substance which shows the antibiotic spectrum similar to the sarganin complex and which we have named sarganol.

Sarganan is a crystalline white material (melting point over 300° C.) upon recrystallization from aqueous ethanol. It contains C, H, O, reduces the silver nitrate sodium ethoxide reagent, gave a positive carbazol reaction for carbohydrates, did not reduce Fehling's solution and reacted with semicarbazide hydrochloride to form a compound (melting point 119–120° C.). It shows limited antibiotic activity.

Figure 6:
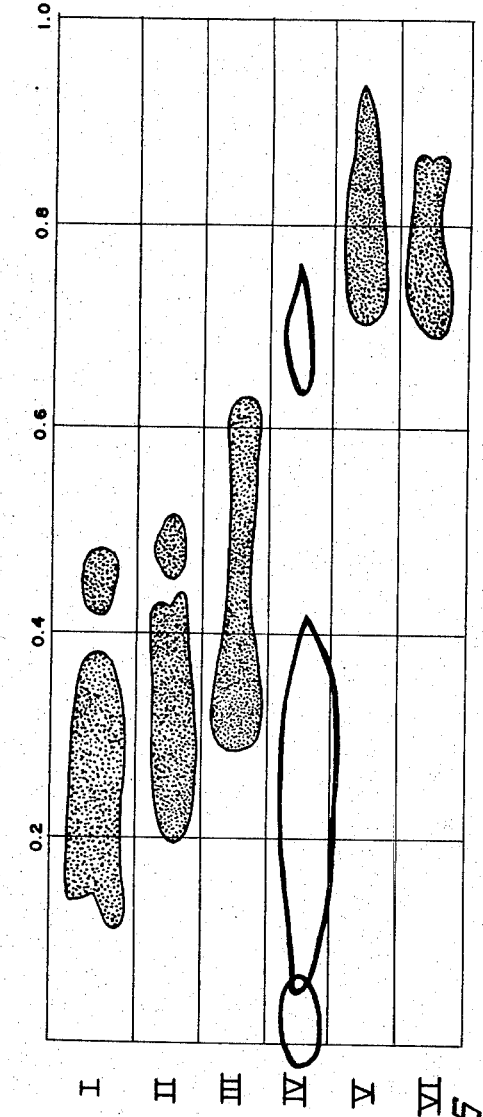

Sarganol is the name given to an oily substance, acid in nature, isolated from the brown alga, *S. natans* and which may be shown, upon resolution by paper chromatography in six different solvent systems, to contain at least three antibiotic components which also exhibit antifungal activity. These activities were identified by paper chromatography as shown in FIG. 6. This oil has a pH of 2.5–

3.0, index of refraction $n_d^{25}=1.4435$. It is soluble in H₂O and ethanol, insoluble in ether, benzene, chloroform, carbon tetrachloride and carbon disulfide. It is also soluble in isotonic NaCl solution.

A dark crystalline material (melting point 40–45° C.) and white needles (melting point 173–180° C.) have also been isolated from *Sargassum natans*. Due to the fact that these substances described have similar biological activities to sarganin complex, they should be regarded as sarganin-like substances. The following example of the isolation of these substances is given by way of illustration only.

Example 2

Eight hundred grams of the ether extracted algae, described previously in Example 1, in this case, *S. natans*, was further extracted in a continuous extractor with boiling ethyl alcohol (95%) for 71 hours. After cooling of the extract thus obtained, 19.8 grams of white crystalline precipitate previously described as sarganan (melting point over 300° C.) was obtained by decantation. The alcoholic extract which remained was concentrated to dryness under reduced pressure. The residue obtained consisted of a semi-solid greenish-mass and a viscous yellow oil removed by centrifugation. This oil, on cooling, gave an additional amount of sarganan. The remaining oil which should be known as sarganol was further purified and its solubility ratio determined. It is acid in nature (pH 2.5–3.0) index of refraction $n_d^{25}=1.4435$ (boiling point 50–55° C.). It does not possess the characteristic smell of sarganin complex. It is soluble in water and alcohol and insoluble in organic solvents such as ether, benzene, chloroform, carbon tetrachloride, and carbon disulfide. It is also soluble in isotonic sodium chloride solution. It is not toxic to rabbits and mice. It is biologically active, its spectrum similar to the sarganin complex although not as strong. Its sodium and potassium salts were microbiologically inactive. Fractions of this oil were obtained by distillation at 40–60° C. at 27.8 inches of vacuum. They were acid in nature (pH 3) and microbiologically active at pH 7 using phosphate buffer.

A third extraction of the same sample (800 g. of *S. natans* previously extracted with ether and alcohol) with alcohol for 110 hours gave 22 additional grams of sarganan and about 30 grams of sarganol.

The greenish mass which remained after evaporation and separation of sarganan and sarganol was greasy in appearance and had the following solubility range: soluble in alcohol, ether, acetone, chloroform, carbon tetrachloride, carbon disulfide; insoluble in H₂O. Zones of bacterial inhibition were obtained from this material also and therefore it should be classified as sarganin-like residue.

Applicant has separated by paper chromatography at least five entities which are present in the alga *Sargassum natans*. Two are nonpolar compounds and three are polar compounds.

What is claimed is:

1. The process for preparing a volatile oily substance having a strong irritating smell, a boiling point between 58–60° C., an index of refraction of $n_d^{25}=1.4380$, a pH between 4 and 5, an infrared absorption spectrum with strong bands at 2.7–3.3μ and 5.55μ, said complex containing carbon, hydrogen, oxygen and sulphur, being soluble in ethyl ether, ethanol, benzene and chloroform and slightly soluble in water, and failing to give coloration in the ferric chloride, Millon, Fehling, Ninhydrin, Benedict, Seliwanoff and Molish tests, comprising extracting with ethyl ether an alga selected from the group consisting of *Sargassum natans, Chondria littoralis* and *Cymopolia barbata*, removing said ethyl ether from the resulting solution to provide a material having a semisolid portion and a volatile oily portion and separating said volatile oily portion from said semisolid portion.

2. A process for preparing a white crystalline carbohydrate of limited antibiotic activity melting above 300° C. which reduces silver nitrate sodium ethoxide reagent, does not reduce Fehling's solution and reacts with semicarbazide hydrochloride to form a compound melting at 119–120° C., comprising extracting *Sargassum natans* with ethyl ether, separating the resulting ethyl ether extract from the alga residue, extracting said residue with ethyl alcohol, precipitating a white crystalline solid comprising said carbohydrate from the resulting alcoholic extract, and separating said solid from said extract.

3. A process for preparing an oil having antibiotic activity, a pH of 2.5–3.0, an index of refraction $n_d^{25}=1.4435$ and a boiling point 50–55° C., said oil being soluble in water, ethanol and isotonic sodium chloride solution and insoluble in ether, benzene, chloroform, carbon tetrachloride and carbon disulfide, comprising extracting *Sargassum natans* with ethyl ether, separating the resulting ethyl ether extract from the alga residue, extracting said residue with hot ethyl alcohol, cooling the resulting alcoholic extract to precipitate a white crystalline solid therefrom, separating said solid from said alcoholic extract, concentrating the remaining alcoholic extract to dryness under reduced pressure to provide a residue consisting of a semisolid portion and a viscous oil, and separating said oil from said residue.

4. The product prepared by the process of claim 1.
5. The product prepared by the process of claim 2.
6. The product prepared by the process of claim 3.

References Cited

Nadal et al., Antimicrobial Agents and Chemotherapy, 1963, American Society for Microbiology, pp. 68–72.

ALBERT T. MEYERS, *Primary Examiner.*

D. STEPHENS, *Assistant Examiner.*

U.S. Cl. X.R.

47—1.4